(12) United States Patent
Dalton et al.

(10) Patent No.: US 12,528,401 B2
(45) Date of Patent: Jan. 20, 2026

(54) MOTORIZED CARGO STRAP DEVICE AND METHOD

(71) Applicants: Mark Dalton, Grand Junction, CO (US); Nikki Dalton, Grand Junction, CO (US)

(72) Inventors: Mark Dalton, Grand Junction, CO (US); Nikki Dalton, Grand Junction, CO (US)

( * ) Notice: Subject to any disclaimer, the term of this patent is extended or adjusted under 35 U.S.C. 154(b) by 393 days.

(21) Appl. No.: 18/122,529

(22) Filed: Mar. 16, 2023

(65) Prior Publication Data

US 2024/0308412 A1 Sep. 19, 2024

(51) Int. Cl.
*B60P 7/00* (2006.01)
*B60P 7/08* (2006.01)

(52) U.S. Cl.
CPC .................... *B60P 7/0846* (2013.01)

(58) Field of Classification Search
CPC ....... B60P 7/0823; B60P 7/083; B60P 7/0838; B65H 75/486
See application file for complete search history.

(56) References Cited

U.S. PATENT DOCUMENTS

| | | | |
|---|---|---|---|
| 5,295,664 A | 3/1994 | Kamper | |
| 7,059,588 B2 | 6/2006 | Goulet | |
| D632,150 S | 2/2011 | Ruan | |
| 8,025,469 B2 * | 9/2011 | Ruan | B60P 7/083 410/103 |
| 10,124,713 B2 | 11/2018 | Evans | |
| 10,280,037 B2 | 5/2019 | Henderson | |
| 10,710,840 B1 | 7/2020 | Williams | |
| 11,111,116 B2 | 9/2021 | Dow | |
| 2008/0001132 A1 * | 1/2008 | Huang | B66D 1/12 254/362 |
| 2012/0145820 A1 * | 6/2012 | White | B60P 7/0846 242/532.6 |
| 2016/0347233 A1 * | 12/2016 | Kingery | B60P 7/0846 |

FOREIGN PATENT DOCUMENTS

WO WO2004002862 8/2004

* cited by examiner

*Primary Examiner* — Steven O Douglas (57) ABSTRACT

A motorized cargo strap device and method for holding down cargo by mechanically winding the cargo strap about a driving member of a motor includes a housing enclosing an interior space. A motor is mounted to the housing and a drive shaft positioned within the housing is engaged to the motor and is rotated in a first direction or second direction by the motor. A first tether is coupled to the housing. A second tether is attached to the drive shaft is wound about the shaft when the drive shaft rotates in the first direction and the second tether is unwound from the drive shaft when the drive shaft rotates in the second direction. A first securing member is attached to the first tether and a second securing member is attached to the second end of the second tether.

13 Claims, 9 Drawing Sheets

MOTORIZED CARGO STRAP DEVICE AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

STATEMENT REGARDING PRIOR DISCLOSURES BY THE INVENTOR OR JOINT INVENTOR

Not Applicable.

BACKGROUND OF THE INVENTION

(1) Field of the Invention

The disclosure relates to cargo strap and more particularly pertains to a new cargo strap for holding down cargo by mechanically winding the cargo strap about a driving member of a motor.

(2) Description of Related Art Including Information Disclosed Under 37 CFR 1.97 and 1.98

The prior art relates to cargo straps and includes a variety of cargo straps including a tethering member being attached to drive shaft, such that the drive shaft winds and unwinds the tethering member thereto. Known prior art does not include a motor engaging with the drive shaft such that the motor rotates the drive shaft in a first direction or a second direction when the motor is turned on.

BRIEF SUMMARY OF THE INVENTION

An embodiment of the disclosure meets the needs presented above by generally comprising a housing enclosing an interior space. A motor is mounted to the housing and a drive shaft positioned within the housing is engaged to the motor and is rotated in a first direction or second direction by the motor. A power supply is electrically coupled to the motor. A first tether is coupled to the housing and includes a distal end and a proximal end relative to the housing, wherein the proximal end is attached to the housing in a static condition such that the first tether defines an anchor. A second tether extends into the housing and is coupled to the drive shaft and includes a first end and a second end. The first end is attached to the drive shaft, wherein the second tether is wound about the shaft when the drive shaft rotates in the first direction and the second tether is unwound from the drive shaft when the drive shaft rotates in the second direction. A first securing member is attached to the first tether and is configured to be releasably attached to a first anchor point. A second securing member is attached to the second end of the second tether and is configured to be releasably attached to a second anchor point.

Another embodiment of the disclosures comprises a method including the steps of attaching a first securing member of a first tether to a first anchor point positioned on a cargo transport. The first tether is attached to a housing. A second tether unwinds from a drive shaft mounted within the housing and extends it over one or more articles positioned on the cargo transport. A second securing member of the second tether attaches to a second anchor point positioned on the cargo transport. A motor mounted within the housing is turned on and mechanically couples to the drive shaft to wind the second tether on the drive shaft to pull the second tether taut against the one or more articles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
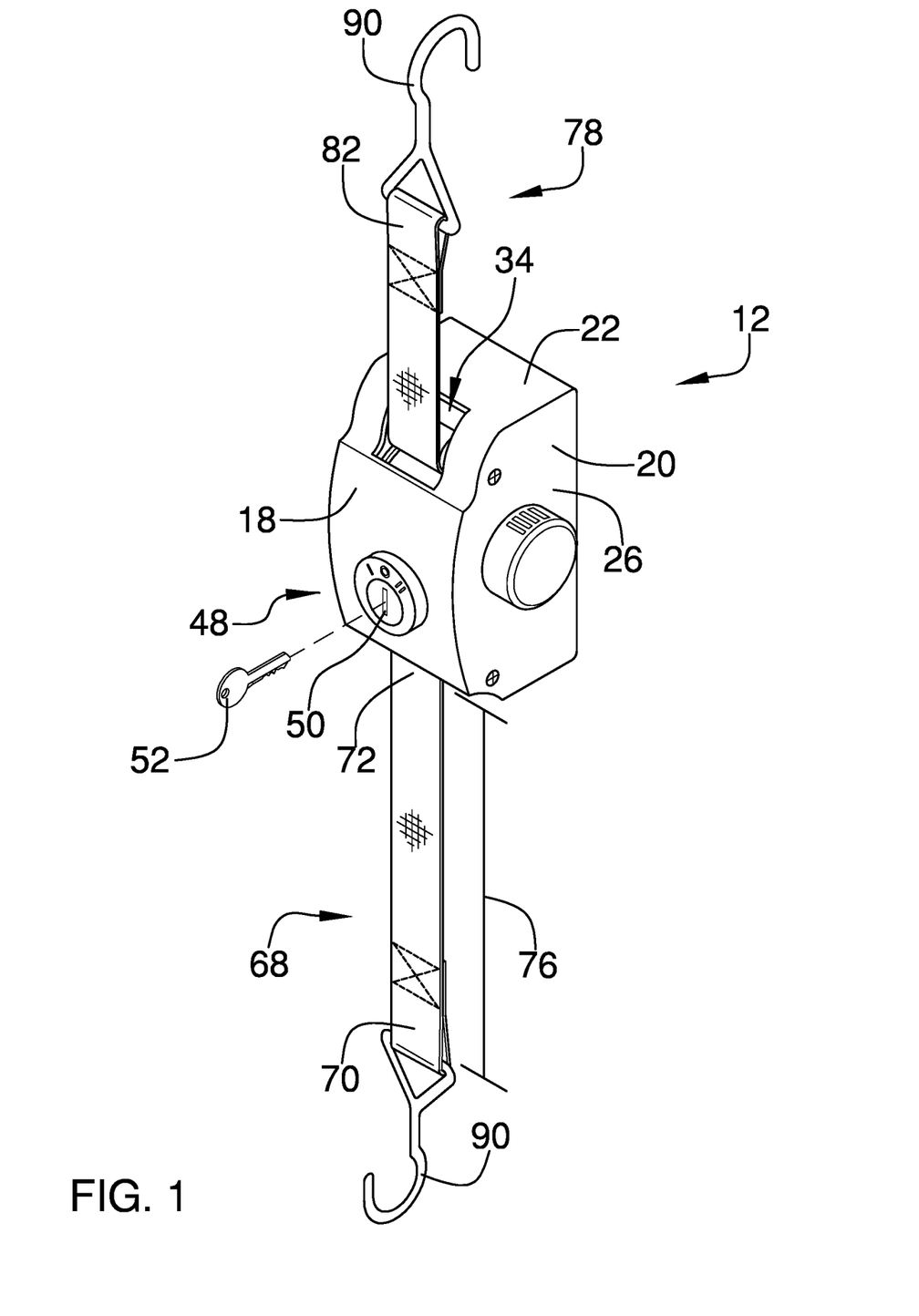
FIG. 1 is a top isometric view of a motorized cargo strap device and method according to an embodiment of the disclosure.
Figure 2:
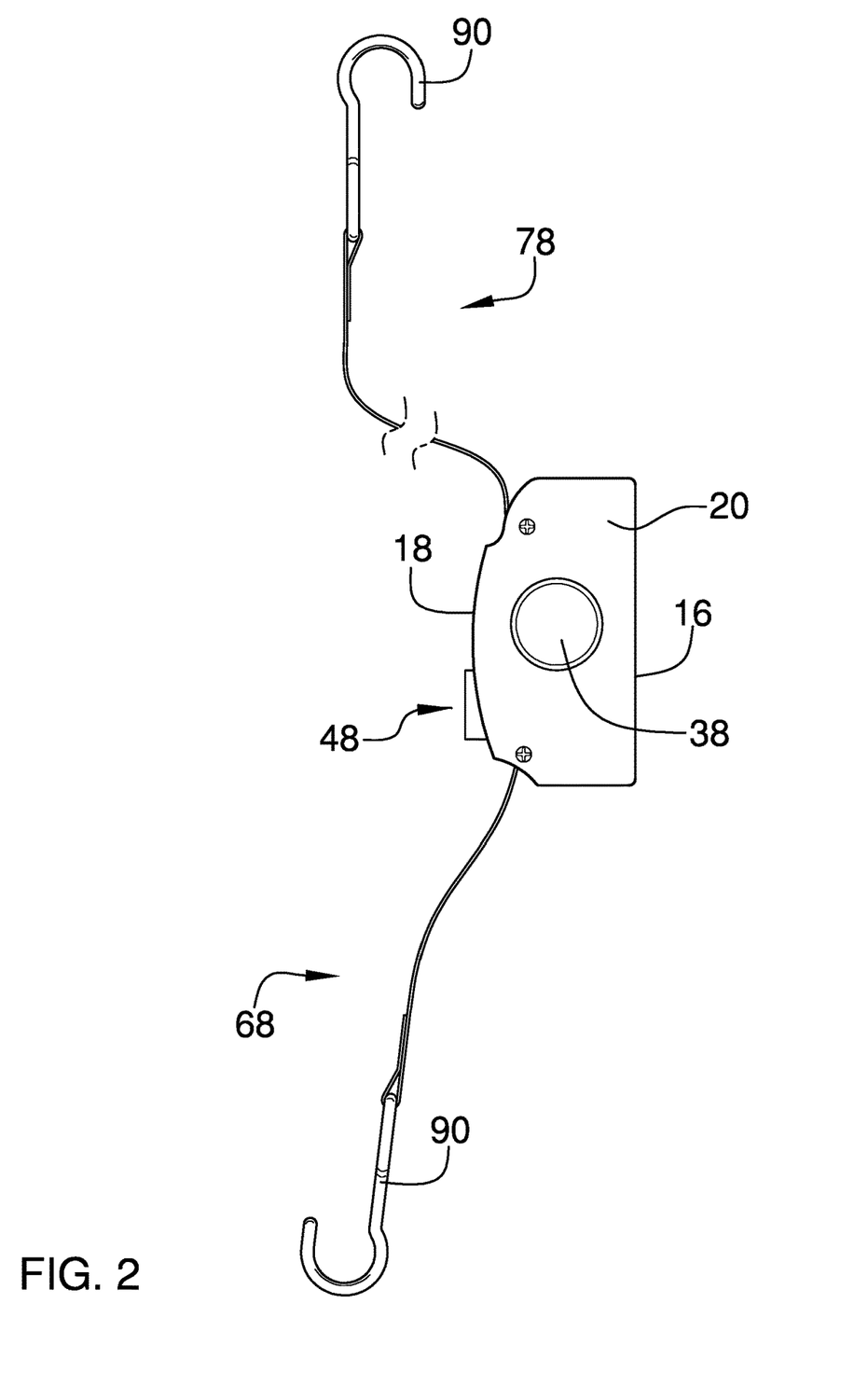
FIG. 2 is a side view of an embodiment of the disclosure.
Figure 3:
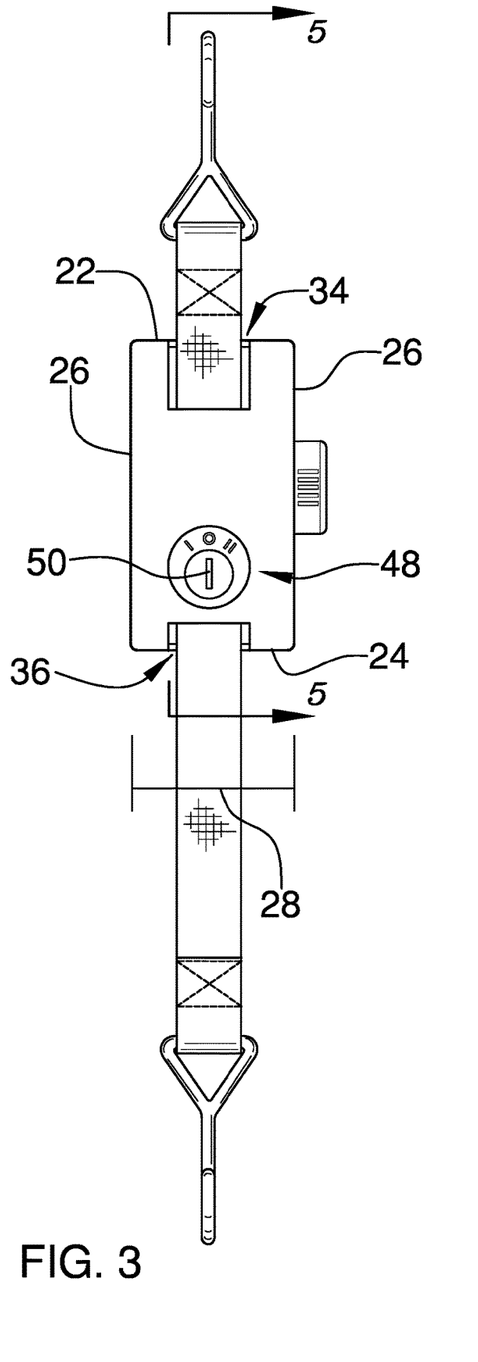
FIG. 3 is a front view of an embodiment of the disclosure.
Figure 4:
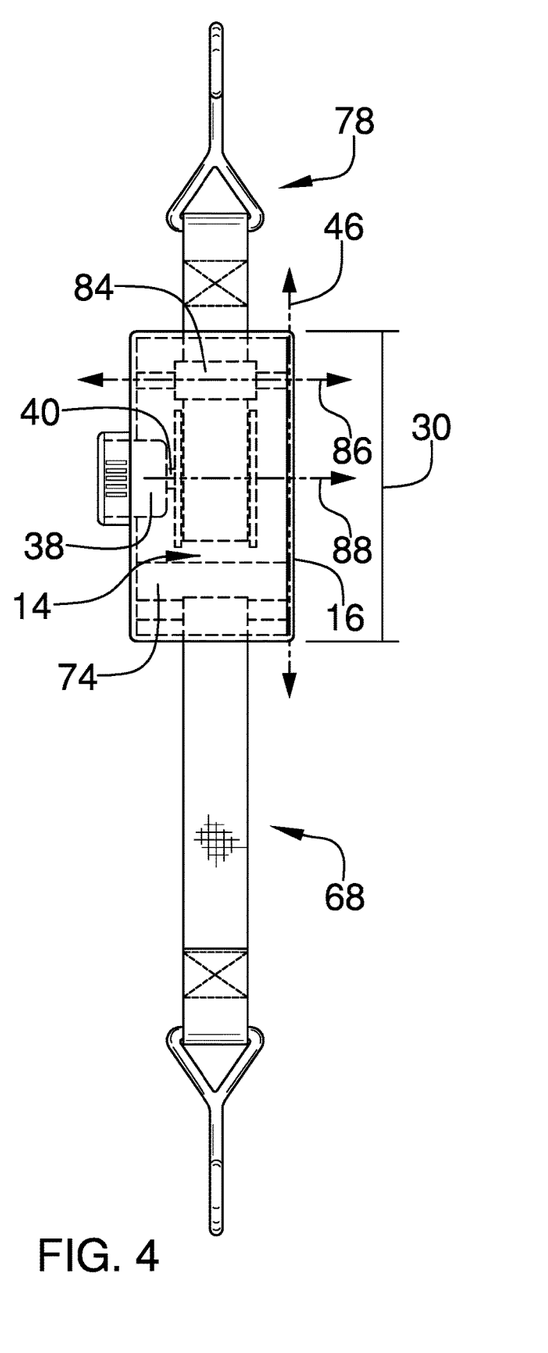
FIG. 4 is a rear view of an embodiment of the disclosure.
Figure 5:
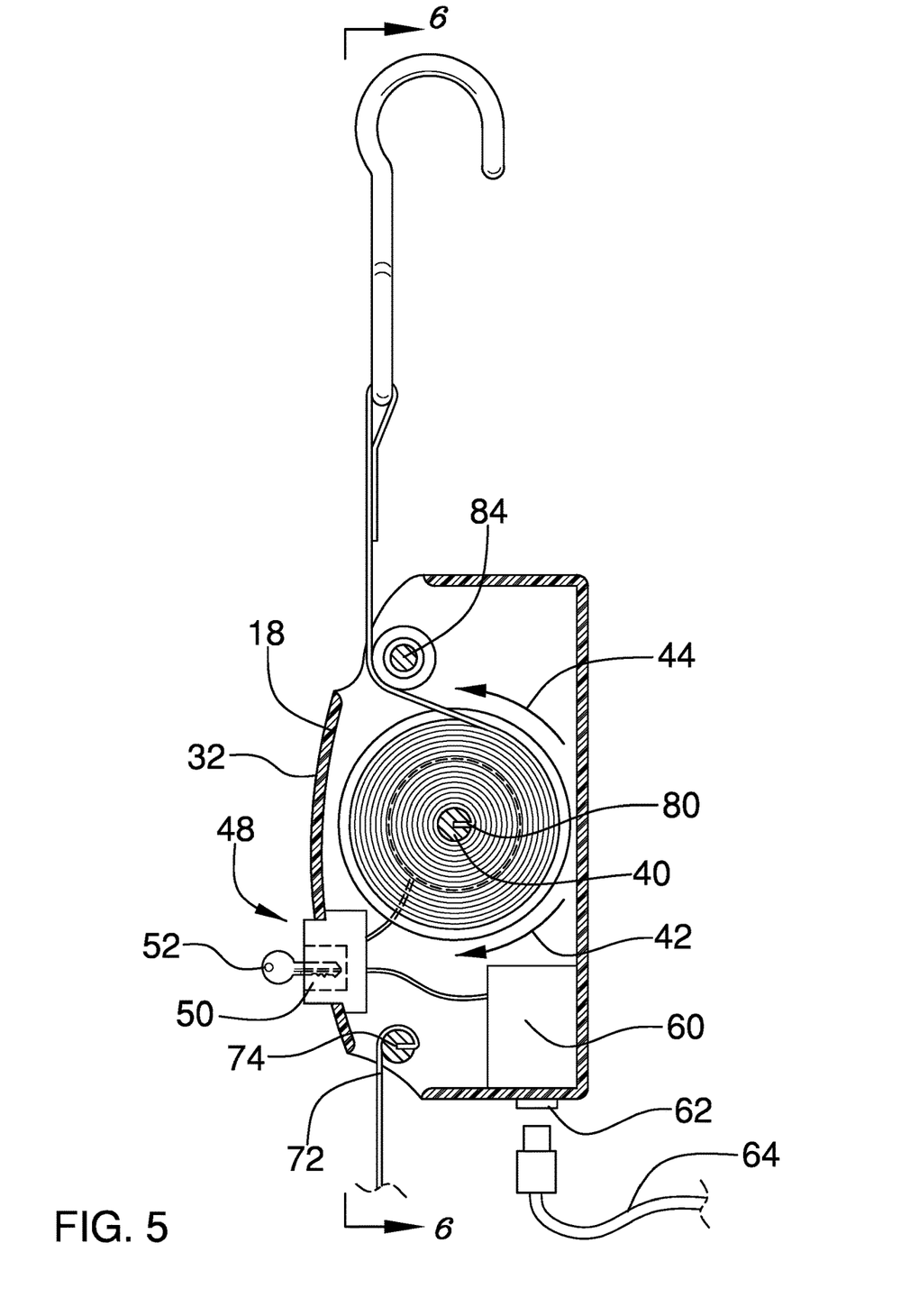
FIG. 5 is a cross-sectional view of an embodiment of the disclosure taken along Line 5-5 of FIG. 3.
Figure 6:
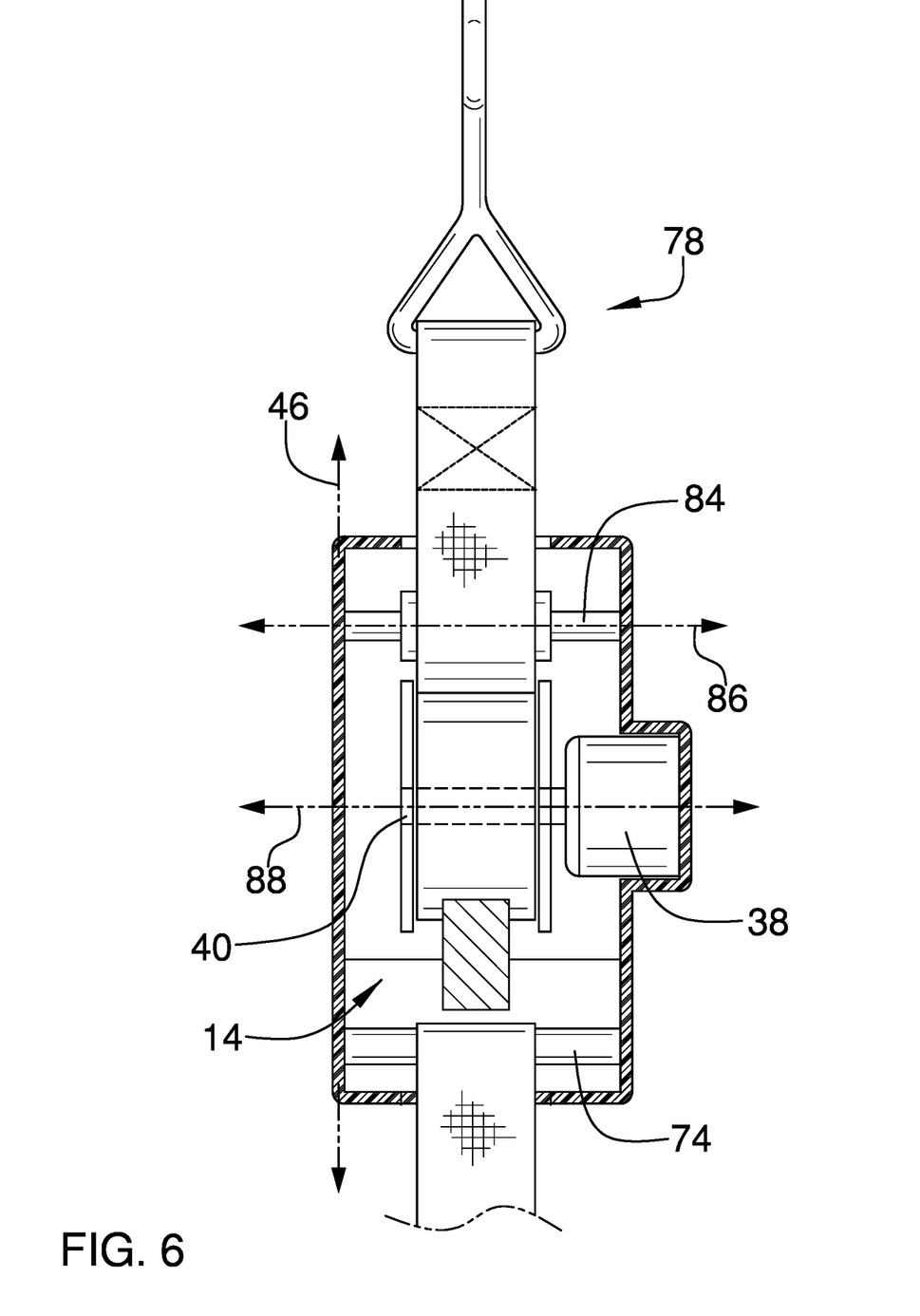
FIG. 6 is a cross-sectional view of an embodiment of the disclosure taken along Line 6-6 of FIG. 5.
Figure 7:
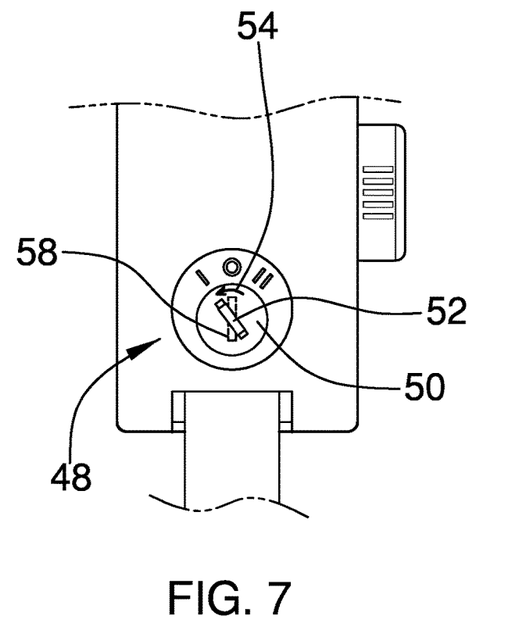
FIG. 7 is a detail view of an embodiment of the disclosure.
Figure 8:
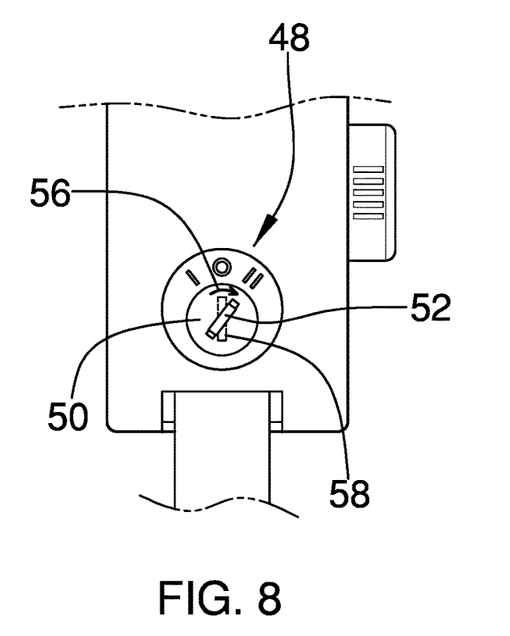
FIG. 8 is a detail view of an embodiment of the disclosure.
Figure 9:
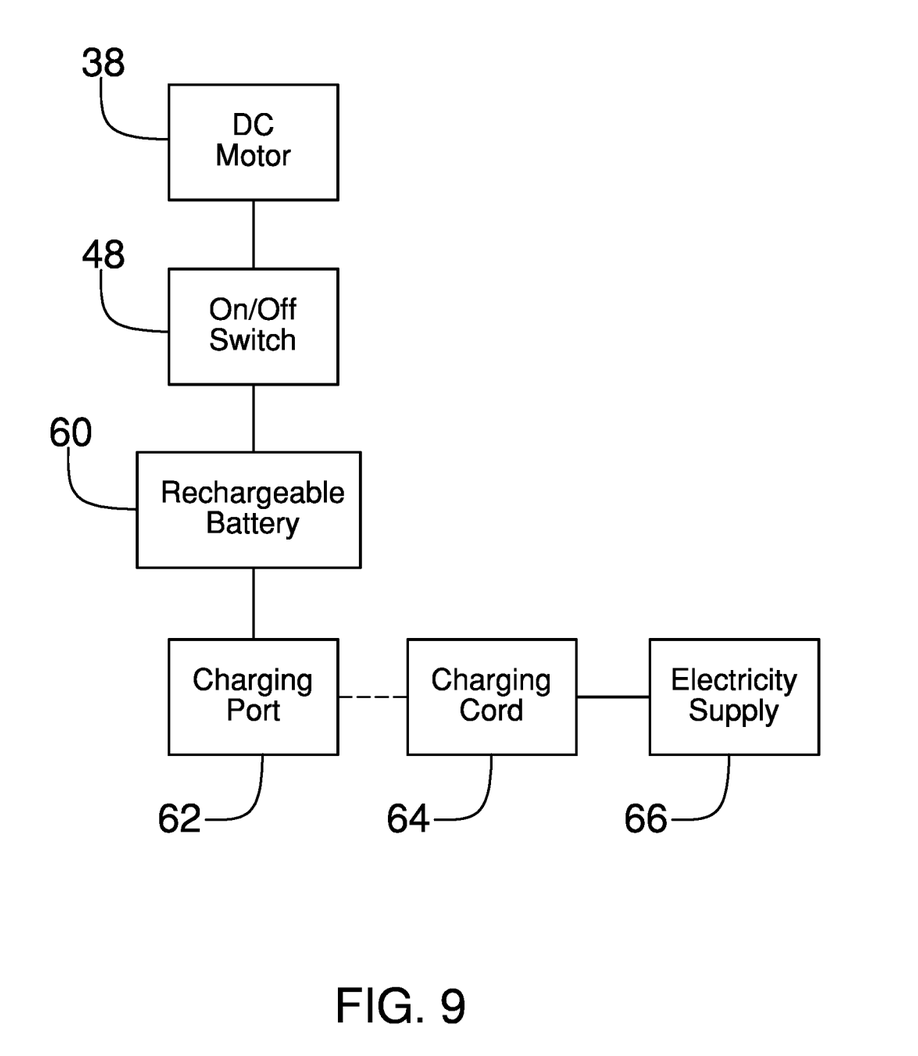
FIG. 9 is a block diagram view of an embodiment of the disclosure.
Figure 10:
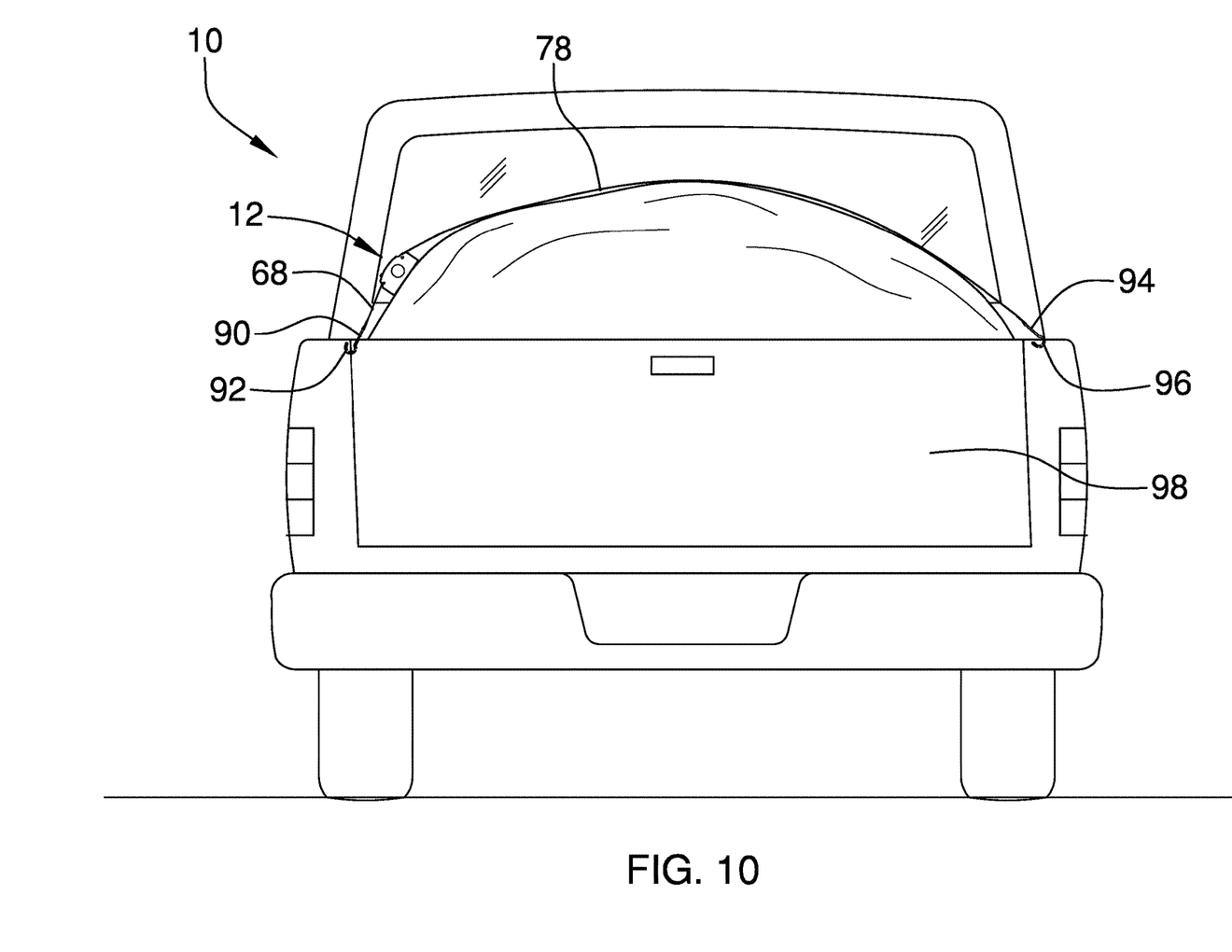
FIG. 10 is an in-use view of an embodiment of the disclosure.
Figure 11:
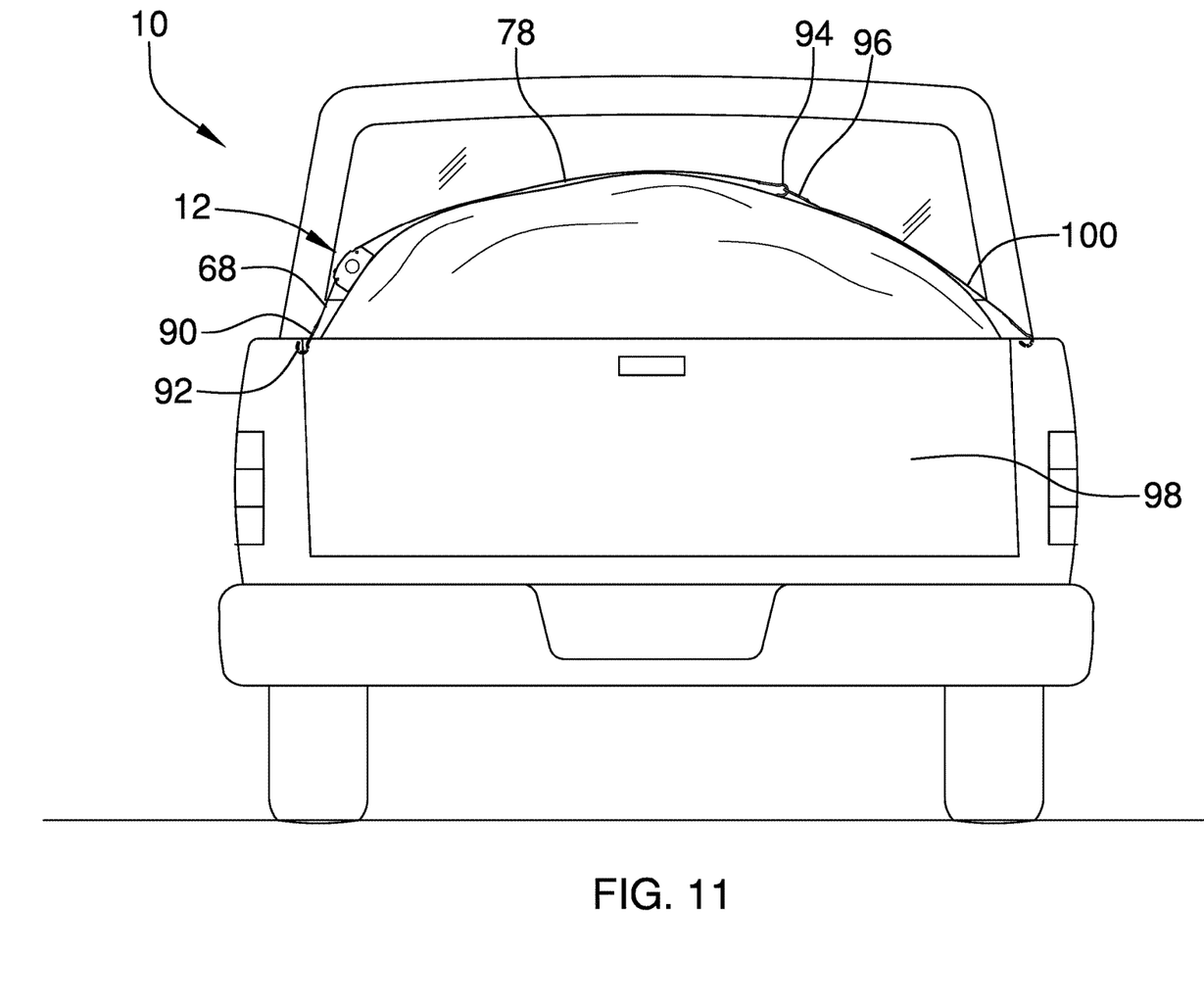
FIG. 11 is an in-use view of an embodiment of the disclosure.

With reference now to the drawings, and in particular to FIGS. 1 through 11 thereof, a new cargo strap embodying the principles and concepts of an embodiment of the disclosure and generally designated by the reference numeral 10 will be described.

As best illustrated in FIGS. 1 through 11, the motorized cargo strap device and method 10 generally comprises a housing 12 enclosing an interior space 14. The housing 12 includes a back wall 16, a front wall 18, and a perimeter wall 20 attached to and extending between the front wall 18 and the back wall 16. The perimeter wall 20 typically includes a top wall 22, a bottom wall 24, and a pair of lateral walls 26. A depth 28 of the housing 12 measures between each of the lateral walls 26 and is normally between 2.50 inches and 3.50 inches, wherein the depth 28 is typically around 3.00 inches. A height 30 of the housing 12 measures from the bottom wall 24 to the top wall 22 and is normally between 5.50 inches and 6.50 inches, wherein the height 30 is typically around 6.00 inches. The front wall 18 has an exterior surface 32 that may be convexly arcuate from the top wall 22 to the bottom wall 24. The top wall 22 normally has a first opening 34 extending therethrough into the interior space 14 and the bottom wall 24 may have a second opening 36 extending therethrough into the interior space 14. The housing 12 may comprise a fluid and liquid impermeable material having a high tensile strength and a high toughness such as stainless steel, aluminum, silicone rubber, or any other conventional material being defined as weatherproof.

A motor 38 is mounted to the housing 12 and may be positioned within the housing 12. A drive shaft 40 positioned within the housing 12 is engaged to the motor 38 and is rotated in a first direction 42 or second direction 44 by the motor 38. The drive shaft 40 is normally orientated perpendicular to a plane 46 of one of the lateral walls 26. A switch 48 is mounted to the front wall 18 of the housing 12 and is electrically coupled to the motor 38. The switch 48 is actuated to cause rotation of the motor 38 in a first direction 42, a second direction 44, or turn off the motor 38. The switch 48 may include a receiver 50 and a key 52, wherein the key 52 is inserted into the receiver 50 to actuate the motor 38. The purpose of the key 52 is to inhibit unauthorized users without the key 52 from actuating the switch 48, wherein the key 52 provides security by only allowing a user having the key 52 to be able to actuate the switch 48. The key 52 may turn the receiver 50 to a first position 54 to rotate the drive shaft 40 in the first direction 42 and the key 52 may turn the receiver 50 to a second position 56 to rotate the drive shaft 40 in the second direction 44. The key 52 may be positioned into a center position 58 to turn off the motor 38 prior to removing the key 52 from the receiver 50.

A power supply 60 is electrically coupled to the motor 38 and is typically positioned within the housing 12. The power supply 60 may be a rechargeable battery having a voltage between 4 volts to 8 volts, wherein the voltage of the rechargeable battery is typically around 6 volts. A power port 62 may be mounted to the housing 12 and may be electrically coupled to the power supply 60, wherein the power port 62 may receive electricity from a power cord 64 of an electricity source 66. The power port 62 is normally mounted on the bottom wall 24 of the housing 12.

A first tether 68 is coupled to the housing 12 and includes a distal end 70 and a proximal end 72 relative to the housing 12, wherein the proximal end 72 is attached to the housing 12 in a static condition such that the first tether 68 defines an anchor. The first tether 68 may extend through the second opening 36. A fixed rod 74 may be mounted within the housing 12 and may be positioned adjacent to the bottom wall 24 such that the first tether 68 may be attached to the fixed rod 74. The first tether 68 has a length 76 measuring from the distal end 70 to the proximal end 72. The length 76 is normally between 10 inches and 14 inches, wherein the length 76 is typically around 12 inches.

A second tether 78 extends into the housing 12 and is coupled to the drive shaft 40. The second tether 78 includes a first end 80 and a second end 82. The first end 80 is attached to the drive shaft 40, wherein the second tether 78 is wound about the shaft when the drive shaft 40 rotates in the first direction 42 and the second tether 78 is unwound from the drive shaft 40 when the drive shaft 40 rotates in the second direction 44. The first 68 and second 78 tethers normally will comprise a webbing material such as nylon, polyester, or any other webbing material having a high toughness, wherein the webbing material of the first 68 and second 78 tethers is able to absorb a high level of shock applied thereto.

A guide roller 84 may be mounted within the housing 12 and may be positioned adjacent to the top wall 22. The guide roller 84 may have an axis of rotation 86 orientated parallel a rotational axis 88 of the drive shaft 40. The drive shaft 40 is positioned nearer to the back wall 16 than the front wall 18 such that the guide roller 84 may be positioned nearer to the front wall 18 than the back wall 16. The second tether 78 may be positioned against the guide roller 84, wherein the guide roller 84 facilitates winding and unwinding the second tether 78 from the drive shaft 40 by applying tension force to the second tether 78 from the positioning of the guide roller 84 relative to the drive shaft 40.

A first securing member 90 is attached to the first tether 68 and is configured to be releasably attached to a first anchor point 92. A second securing member 94 is attached to the second end 82 of the second tether 78 and is configured to be releasably attached to a second anchor point 96. Each of the first 90 and second 94 securing members normally comprise a hook, a clip, or any other conventional securing member of a cargo strap. The first 90 and second 94 securing members will normally attach to a cargo transport 98 such as a trailer or a bed of a truck, wherein the first anchor point 92 may comprise a first side edge of the trailer and the second anchor point 96 may comprise a second side edge of the trailer. Alternatively, the first anchor point 92 or the second anchor point 96 may comprise a fastening member of an additional cargo strap 100, wherein the first 68 and second 78 tethers may couple with the additional cargo strap 100 to tie down articles to the cargo transport 98.

In use, the first securing member 90 of the first tether 68 is attached to the first anchor point 92 positioned on the cargo transport 98. The first tether 68 is attached to the housing 12 and the second tether 78 unwinds from the drive shaft 40 mounted within the housing 12 when the key 52 positions the receiver 50 into the second position 56. The second tether 78 extends over one or more articles positioned on the cargo transport 98 and the second securing member 94 of the second tether 78 attaches to the second anchor point 96 positioned on the cargo transport 98 thereafter. The key 52 positions the receiver 50 into the first position 54 to wind the second tether 78 on the drive shaft 40 to pull the second tether 78 taut against the one or more articles.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A motorized cargo strap device comprising:
   a housing enclosing an interior space;
   a motor being mounted to said housing;
   a drive shaft positioned within said housing being engaged to said motor and being rotated in a first direction or second direction by said motor;
   a switch being mounted to said front wall of said housing and being electrically coupled to said motor, said switch being actuated to cause rotation of said motor in a first direction, a second direction, or turn off said motor, said switch including a receiver and a key, wherein said key is inserted into said receiver to actuate said motor, said key turning said receiver to a first position to rotate said drive shaft in said first direction, said key turning said receiver to a second position to rotate said drive shaft in said second direction;
   a power supply being electrically coupled to said motor;
   a first tether being coupled to said housing, said first tether including a distal end and a proximal end relative to said housing, wherein said proximal end is attached to said housing in a static condition such that said first tether defines an anchor;
   a second tether extending into said housing and being coupled to said drive shaft, said second tether including a first end and a second end, said first end being attached to said drive shaft, wherein said second tether is wound about the shaft when said drive shaft rotates in said first direction and said second tether is unwound from said drive shaft when said drive shaft rotates in said second direction;
   a first securing member being attached to said first tether and being configured to be releasably attached to a first anchor point; and
   a second securing member being attached to said second end of said second tether and being configured to be releasably attached to a second anchor point.

2. The motorized cargo strap device of claim 1, wherein said housing includes a back wall, a front wall, and a perimeter wall attached to and extending between said front wall and said back wall, said perimeter wall including a top wall, a bottom wall, and a pair of lateral walls, said front wall having an exterior surface being convexly arcuate from said top wall to said bottom wall, said top wall having a first opening extending therethrough into said interior space and said bottom wall having a second opening extending therethrough into said interior space.

3. The motorized cargo strap device of claim 1, wherein said motor is positioned within said housing.

4. The motorized cargo strap device of claim 2, wherein said drive shaft is orientated perpendicular to a plane of one of said lateral walls.

5. The motorized cargo strap device of claim 1, wherein said power supply is positioned within said housing, said power supply being a rechargeable battery.

6. The motorized cargo strap device of claim 1, further including a power port being mounted to said housing and being electrically coupled to said power supply.

7. The motorized cargo strap device of claim 1, wherein said first tether extends through said second opening, a fixed rod being mounted within said housing and being positioned adjacent to said bottom wall, said first tether being attached to said fixed rod.

8. The motorized cargo strap device of claim 1, further including a guide roller being mounted within said housing and being positioned adjacent to said top wall, said guide roller having an axis of rotation orientated parallel a rotational axis of said drive shaft, said drive shaft being positioned nearer to said back wall than said front wall, said guide roller being positioned nearer to said front wall than said back wall.

9. The motorized cargo strap device of claim 1, wherein each of said first and second securing members comprises a hook.

10. A motorized cargo strap device comprising:
    a housing enclosing an interior space, said housing including a back wall, a front wall, and a perimeter wall attached to and extending between said front wall and said back wall, said perimeter wall including a top wall, a bottom wall, and a pair of lateral walls, said front wall having an exterior surface being convexly arcuate from said top wall to said bottom wall, said top wall having a first opening extending therethrough into said interior space and said bottom wall having a second opening extending therethrough into said interior space;
    a motor being mounted to said housing, said motor being positioned within said housing;
    a drive shaft positioned within said housing being engaged to said motor and being rotated in a first direction or second direction by said motor, said drive shaft being orientated perpendicular to a plane of one of said lateral walls;
    a switch being mounted to said front wall of said housing and being electrically coupled to said motor, said switch being actuated to cause rotation of said motor in a first direction, a second direction, or turn off said motor, said switch including a receiver and a key, wherein said key is inserted into said receiver to actuate said motor, said key turning said receiver to a first position to rotate said drive shaft in said first direction, said key turning said receiver to a second position to rotate said drive shaft in said second direction;
    a power supply being electrically coupled to said motor, said power supply being positioned within said housing, said power supply being a rechargeable battery;
    a power port being mounted to said housing and being electrically coupled to said power supply;
    a first tether being coupled to said housing, said first tether including a distal end and a proximal end relative to said housing, wherein said proximal end is attached to said housing in a static condition such that said first tether defines an anchor, said first tether extending through said second opening, a fixed rod being mounted within said housing and being positioned adjacent to said bottom wall, said first tether being attached to said fixed rod;
    a second tether extending into said housing and being coupled to said drive shaft, said second tether including a first end and a second end, said first end being attached to said drive shaft, wherein said second tether is wound about the shaft when said drive shaft rotates in said first direction and said second tether is unwound from said drive shaft when said drive shaft rotates in said second direction;

a guide roller being mounted within said housing and being positioned adjacent to said top wall, said guide roller having an axis of rotation orientated parallel a rotational axis of said drive shaft, said drive shaft being positioned nearer to said back wall than said front wall, said guide roller being positioned nearer to said front wall than said back wall;

a first securing member being attached to said first tether and being configured to be releasably attached to a first anchor point; and a second securing member being attached to said second end of said second tether and being configured to be releasably attached to a second anchor point, each of said first and second securing members comprising a hook.

11. A method of securing cargo comprising the steps of:

attaching a first securing member of a first tether to a first anchor point positioned on a cargo transport, the first tether being attached to a housing;

unwinding a second tether from a drive shaft mounted within the housing and extending it over one or more articles positioned on the cargo transport;

attaching a second securing member of the second tether to a second anchor point positioned on the cargo transport; and turning on a motor mounted within the housing and mechanically coupled to the drive shaft to wind the second tether on the drive shaft to pull the second tether taut against the one or more articles, a switch being electrically coupled to said motor, said switch being actuated to cause rotation of said motor in a first direction, a second direction, or turn off said motor, said second tether being unwound from said drive shaft when said drive shaft rotates in said second direction.

12. The method of claim 11, wherein the step of attaching a second securing member of the second tether to a second anchor point positioned on the cargo transport further includes each of said first and second securing members comprising a hook.

13. The method of claim 11, wherein the step of turning on a motor mounted within the housing and mechanically coupled to the drive shaft to wind the second tether on the drive shaft to pull the second tether taut against the one or more articles further includes said second tether being wound to said drive shaft when said drive shaft rotates in said first direction.

* * * * *